Figure 1:
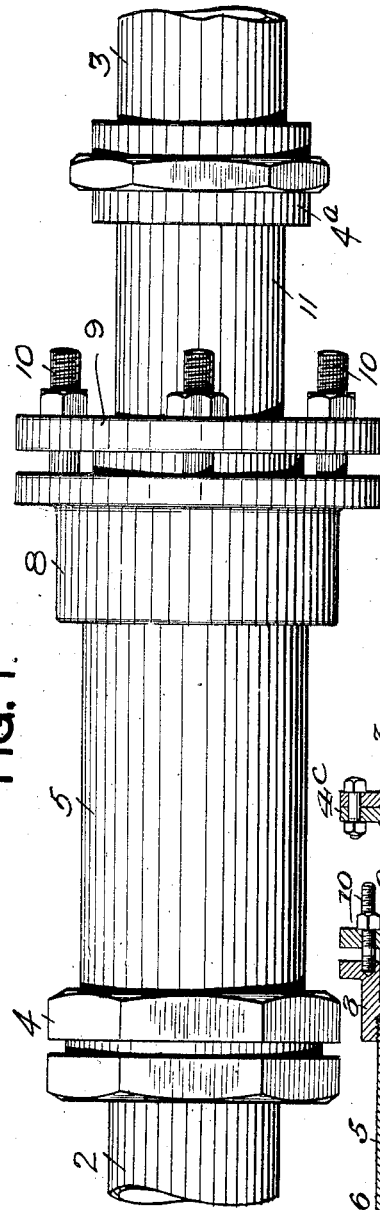

J. T. KELLY.
EXPANSION JOINT.
APPLICATION FILED FEB. 7, 1910.

1,079,350.

Patented Nov. 25, 1913.

WITNESSES.
J. R. Keller
Robert C. Totten

INVENTOR.
John T. Kelly
By Kay & Totten
attorneys

UNITED STATES PATENT OFFICE.

JOHN T. KELLY, OF BROOKLYN, NEW YORK, ASSIGNOR OF ONE-HALF TO GEORGE M. JONES, OF PITTSBURGH, PENNSYLVANIA.

EXPANSION-JOINT.

1,079,350.

Specification of Letters Patent.

Patented Nov. 25, 1913.

Application filed February 7, 1910. Serial No. 542,639.

*To all whom it may concern:*

Be it known that I, JOHN T. KELLY, a resident of Brooklyn, in the county of Kings and State of New York, have invented a new and useful Improvement in Expansion-Joints; and I do hereby declare the following to be a full, clear, and exact description thereof.

My invention relates to expansion joints for use in water, steam or gas lines, where there is a considerable variation in temperature.

The expansion joint employed in practical use consists of a cast iron body having a stuffing box and a cast brass sleeve fitting telescopically therein so that said sleeve is free to adjust itself longitudinally in said cast iron body according as the expansion or contraction takes place in the line, due to the changes of temperature to which the line is exposed. These expansion joints are formed of various lengths to suit the length of traverse of the sleeve within the body and are formed either with screw or with flange joints for connection with the main line of pipe. To provide the expansion joints to suit the different sizes and lengths of traverse separate castings for each separate part are required, such castings varying for each different size according to the different lengths of traverse and it being necessary to provide special patterns and castings for each variation in length of joint as well as in diameter, so that where special lengths of joints are required or parts are required for repair, they cannot be obtained without being specially ordered and great delay is experienced in either the manufacture of such special lengths or in replacing for repair.

One of the objects of my invention is to provide a strong and durable expansion joint made up of sections of tubing and which can be varied in length as desired, together with special connections which may be staple articles of manufacture and carried in stock by supply houses, so that the joints may be provided without delay occasioned by waiting for special castings or other parts to be furnished, which may require the making of new patterns and core boxes; and by which expansion joints varying in length may be readily produced by the simple operation of cutting the tubing to the desired length and without change in the special staple connections or fittings.

Another object is to provide such expansion joint formed of greater strength and lighter in weight and having the main portion formed of strong condensed wrought metal while providing an especially smooth and polished sleeve to work within the stuffing box, making the joint much more sensitive so that it responds more quickly to the differences in expansion and contraction and preventing wear of the packing material in the stuffing box, and one which has a high resistance to corrosion and is not so liable to injury from the liquids or fluids flowing through the same.

To these ends my invention consists, generally stated, in an expansion joint having its outer body portion formed of a wrought metal tube, having at one end a coupling for connection with the main line and at the other end a separate metal stuffing box, and having its inner telescoping member or sleeve formed of a plain section of drawn wrought metal tubing passing through the stuffing box. It also includes other improvements as hereinafter stated.

Figure 2:
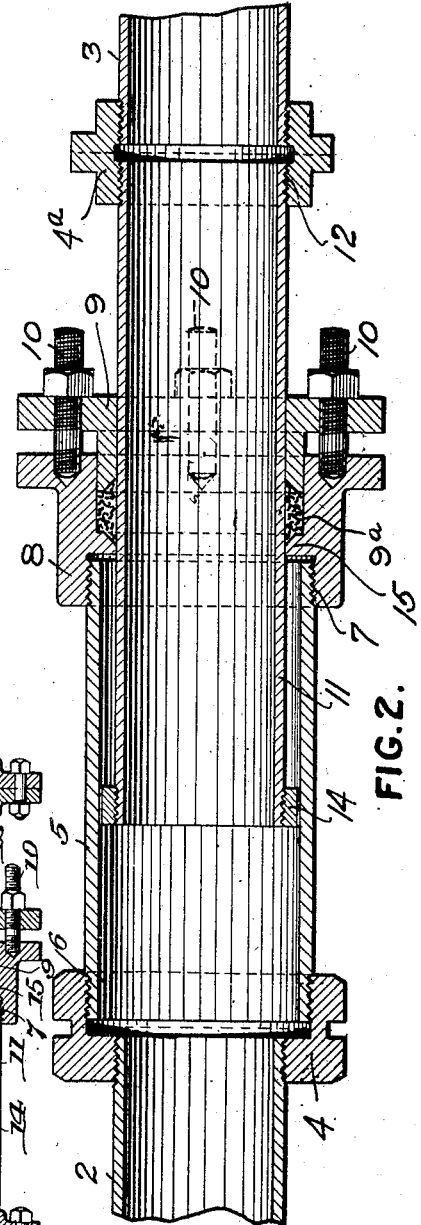

In the drawing Figure 1 is an exterior view of my improved expansion joint; Fig. 2 is a longitudinal section thereof; and Fig. 3 is a longitudinal section showing another form of couplings for the parts.

Figure 3:
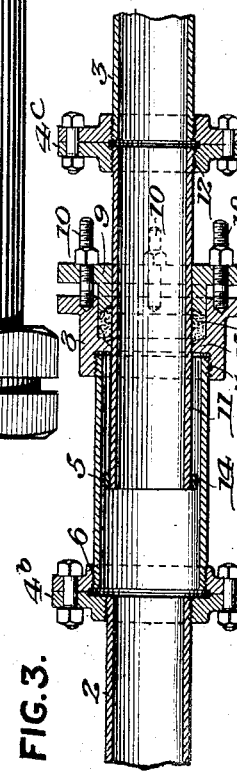

In the drawing the numerals 2 and 3 represent sections of the main line of pipe, said sections having suitable threaded couplings 4 and 4ª in Fig. 2; while in Fig. 3 the parts are coupled by flanged couplings 4°, 4ᵇ screwing onto the different parts. The other reference numerals on said Fig. 3 are the same as on Fig. 2. The coupling is arranged for connection with the outer body portion which is formed of a plain straight section of standard wrought steel tubing having the threaded end 6 engaging with the coupling 4, and at its opposite end provided with the threads 7 on which the stuffing box 8 is secured. This section 5 of wrought steel tubing can be of any desired length according to the length of traverse of the expansion joint, it only being necessary to cut the same to the desired length, varying according to the traverse, and thread and screw it into the coupling and the stuffing box. By making the body 5 of wrought steel its strength is greatly increased and the liability of breaking found in cast iron is overcome, while the weight of the stuffing box is very much reduced. The stuffing box 8 has the gland 9, and said gland is connected to said stuffing box by means of the threaded bolts 10, suitable packing 9ª being employed. The inner section or sleve 11 of the expansion joint consists of a straight plain section of standard drawn tubing, preferably being formed of a copper containing metal, such as brass or copper tubing, having a higher co-efficient of expansion than the wrought iron or steel section 5, and having a high resistance to corrosion, while any corrosive action on its surface leaves it practically smooth. This sleeve 11, like the body 5, can be cut to the desired length suitable for the length of traverse of the stuffing box to be produced, and it is only necessary to thread the end thereof and screw the same into the coupling 4 connecting it with the main line pipe 3. The sleeve 11 passes through stuffing box 8 and forms a close joint therewith to prevent leakage, and it enters the wrought metal body portion 5 for the desired distance. The drawn tubing 11 forming the sleeve has a very smooth highly polished surface which fits within the stuffing box so as to move freely therein under the expansion and contraction of the main line pipe, the joint being held tight by the packing 9ª within the stuffing box 8, and the smooth, polished surface of the drawn tubing provides a more perfect surface for forming a tight joint with such packing than can be obtained where the sleeve is formed of cast iron or brass turned and ground, as the drawn tubing has a hardened surface or skin formed thereon which has much higher wearing qualities than the surface of a cast sleeve, while even if slight imperfections exist, as the fiber of the drawn tubing extends longitudinally thereof in the direction of movement of the sleeve within the stuffing box, it presents a more perfect surface than can be obtained with a cast sleeve turned and ground, in which case the irregularities extend around the body of the sleeve. The drawn wrought metal is also exceedingly dense and firm and therefore is able to resist cutting action of acids or other fluids better than cast metal and is therefore not so liable to cut off in use and form imperfections which would affect the tightness of the joint, while as it has no welded line of junction it presents a perfect surface entirely around the body of the tubing. The drawn copper containing tubing preferably used for the telescoping of the pipe has also the advantage of high resistance to corrosion, while as its surface is highly compacted in the formation thereof, any possible action of acid thereon leaves it practically perfectly smooth and polished so that the close joint through the stuffing box is maintained. In order to prevent the expansion joint from pulling apart and to center the drawn metal section of tubing within the body of the tube, I prefer to thread the inner end of the seamless drawn tube section 11 and screw thereon the collar 14 which, in case of heavy contraction in the line of tubing, engages with the collar 15 of the stuffing box and prevents blowing out of the joint. This collar also serves the purpose of centering the sleeve 11 within the body 5, insuring the contraction and expansion of the joint without throwing the parts under lateral strain, and so insuring perfect movement of the joint.

When my improved expansion joint is in use under the expansion and contraction of the main line, due to changes of temperature, the drawn tube section forming the sleeve 11 slides back and forth within the stuffing box, and on account of the highly polished condensed surface of the drawn seamless tube from which the sleeve is formed it is exceedingly sensitive to changes of temperature, while because of such highly polished surface it preserves a tight joint without appreciable wear upon the packing within the stuffing box. By the employment of the drawn copper-containing tube for the telescoping member of the joint an expansion joint is provided which has a high resistance to corrosion without the necessity of making the entire joint of such copper-containing material, so greatly cheapening the same. The action of the gases or fluids will be resisted by the drawn compacted surface of such copper-containing tube, which is the member extending through the stuffing box and therefore a more perfect and durable joint will be provided, the drawn surface of such copper-containing tube resisting the action of such fluids more perfectly than an ordinary cast brass or other copper-containing tube and in case parts of the joint remain in the same relative position without the sliding of the tube through the stuffing box for any great period, all liability of the sticking of the tube in place through corrosion of the outer metal surface thereof and of the gland 9 together is overcome, all iron expansion joints being liable to this action. The different castings of the joint including the couplings 4 and 4ª and the stuffing box 8 can be kept in stock by manufacturers and dealers, together with the proper size of tubing, and the joints can be quickly assembled by the mere cutting of the body portion 5 and sleeve 11 from the proper sizes of standard wrought metal tubing, the joint being carried in length to suit the varied length of traverse required, and either in the manufacture of the joints or in the supply of parts for repair the joints or parts thereof can be provided quickly and without the necessity of the casting of special parts. This is of special advantage for the users and dealers at great distances from the places of manufacture where to supply the trade they are required to carry in stock only a few parts from which the expansion joints can be quickly assembled. It is also of importance to the manufacturer who is enabled to supply the trade without so large investment in special patterns and castings, and machinery for finishing the same, and who can fill orders without the long delay necessary to make the same. The construction of the joint is also greatly simplified, and the labor in its manufacture is reduced, since the main portions are of standard commercial tubing, while the expensive work of turning and grinding the sleeve portion of the stuffing box is done away with and at the same time a much stronger stuffing box is provided having a much harder and more highly polished sleeve, making a joint which is very sensitive to the slightest expansion or contraction of the line. The joint is also greatly increased in strength because the main body portion and the sleeve which are necessarily made with thin walls, are made of wrought metal which is adapted to resist the high pressures carried in the lines much better than the ordinary casting, and the weight of the stuffing box is materially reduced on account of the thinner and lighter walls of the main body portion and sleeve.

While I am aware that it has been suggested to form certain parts of these expansion joints of wrought metal, yet the other main portion has been always formed of a casting so that the special advantages arising from the present invention making it possible to vary the length of the expansion joint as above described, and to obtain the special advantages as above set forth, have not previously been known.

What I claim is:

1. An expansion joint having its outer body portion formed of wrought metal tubing having at one end a coupling for connection with the main line and at the other end a separate metal stuffing box, and its inner telescoping sleeve formed of a plain section of drawn wrought metal tubing passing through the stuffing box.

2. An expansion joint having its outer body portion formed of wrought metal tubing having at one end a coupling for connection with the main line and at the other end a separate metal stuffing box, and its inner telescoping sleeve formed of a plain section of drawn copper containing metal tubing passing through the stuffing box.

In testimony whereof, I the said JOHN T. KELLY have hereunto set my hand.

JNO. T. KELLY.

Witnesses:
FRANCES KUBANECK,
JNO. J. MCGEE.